United States Patent [19]

Bolling, Jr.

[11] Patent Number: 4,471,546
[45] Date of Patent: Sep. 18, 1984

[54] IDENTIFICATION TAG KIT

[76] Inventor: David R. Bolling, Jr., 8331 Fredericksburg, San Antonio, Tex. 78229

[21] Appl. No.: 431,260
[22] Filed: Sep. 30, 1982
[51] Int. Cl.³ .............................................. G09F 3/00
[52] U.S. Cl. ...................................... 40/301; 40/300; 40/302; 24/47; 24/113 MP; 63/12
[58] Field of Search ............ 40/300, 301, 20 R, 20 A, 40/302; 24/155 SD, 47, 113 MP; 63/12, 13

[56] References Cited
U.S. PATENT DOCUMENTS 1,495,110  5/1924  Roberts .............................. 40/20 R
2,331,636 10/1943  Stone .................................. 40/300
4,176,482 12/1979  Steckel ............................... 40/301

FOREIGN PATENT DOCUMENTS 25481 of 1911 United Kingdom .................. 40/301

Primary Examiner—Gene Mancene
Assistant Examiner—Cary E. Stone
Attorney, Agent, or Firm—Gunn, Lee & Jackson

[57] ABSTRACT

A kit having components capable of being assembled and permanently attached to an object or animal appendage for identification purposes. The kit comprises a collar, an identification plate having a needle extending therethrough and outward therefrom, and a locking device adapted to permanently receive the needle therein. The locking device comprises a first locking plate and a second locking plate connected to the first locking plate in axial alignment therewith. The first locking plate has a pocket within which to receive a retention plate and the base of a needle guard. The needle guard extends outward through a bore in the plate pocket to permit maximum visibility of the needle guard and covers the point of the needle. A method of assembling and attaching the kit is also disclosed.

4 Claims, 7 Drawing Figures

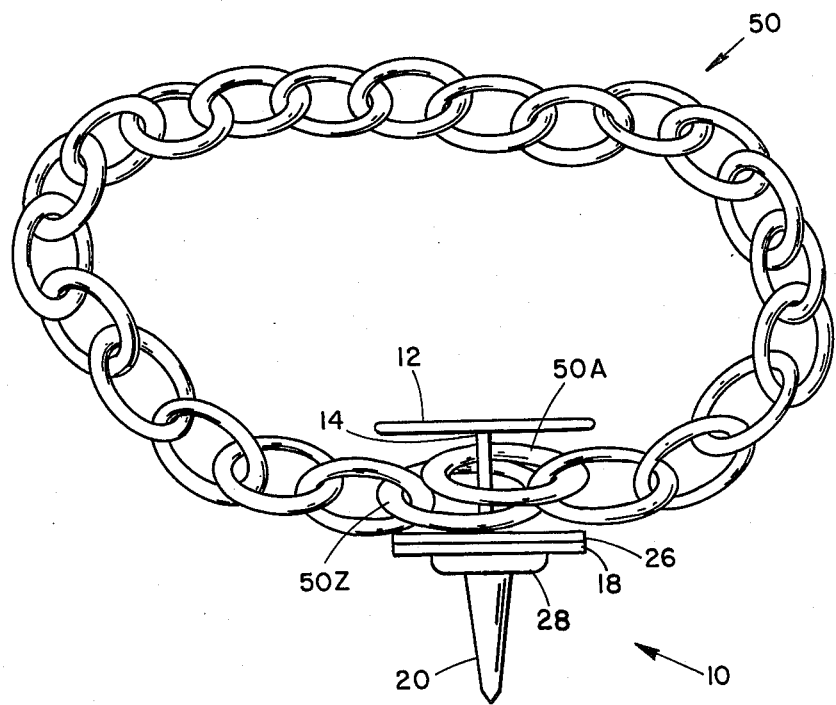

IDENTIFICATION TAG KIT

BACKGROUND OF THE INVENTION

Various types of less permanent tags, labels, and other means for identifying objects or animals have been in use for a number of years. When these tags or labels become unattached or are removed by an unscrupulous individual, however, they cease to identify the desired object or animal. As a result, individuals have resorted to the costly and time consuming process of engraving, embossing, or branding an identifying symbol onto the object or animal.

More permanent types of identification methods often require the puncturing of the object or animal appendage by a sharp instrument, the sharp point of which may cause subsequent injury to the object or animal or a person coming in contact therewith. This danger and nuisance often requires that the sharp instrument be clipped or filed as close as possible to the object or animal appendage. The possibility of a subsequent snag or scrape due to the clipped point dictates that extreme caution be exercised when handling the object or animal. Finally, in prior identification tags having needles extending outward from the identification plate, the needle is welded to the plate on the same side of the plate as the needle. In such an embodiment, the identification plate often breaks loose from the needle and locking plate, rendering the apparatus useless.

The present invention overcomes the numerous limitations inherent in prior identification methods by providing a sturdy identification tag kit having two components that may be assembled and permanently attached to an object or animal without the potential of subsequent injury to a person coming in contact therewith. The present kit also provides a means for readily determining an animal's presence and whether the animal has been tagged. The kit comprises an identification plate having a needle extending therethrough and outward therefrom and a locking means for permanently receiving the needle therein. The needle extends through the center of the identification plate and is welded thereto on the side of the plate opposite the needle point. The locking means comprises a retention plate having a bore for receiving the needle therethrough and a conical needle guard adapted to receive the needle therein. The retention plate prohibits axial movement of the locking means away from the identification plate and the needle guard covers the sharp point of the needle and protects the handler of the object or animal from injury. The constitution of the needle guard also permits maximum visibility of the tag and animal. The locking means also comprises a first locking plate having a first bore for receiving the conical needle guard therethrough, the first locking plate being further adapted to receive the needle guard and retention plate therein. The locking means also comprises a second locking plate connected to the first locking plate, the second locking plate having a second bore for receiving the needle therethrough.

SUMMARY OF THE INVENTION

It is a primary object of the present invention to provide an identification tag kit having two components that can be easily assembled and attached to an object or animal appendage. The kit comprises an identification plate having a needle extending therethrough and outward therefrom and a locking means comprising a retention plate having a bore for receiving the needle therethrough, a conical needle guard, a first locking plate having a first bore for receiving the needle guard therethrough and a second locking plate having a second bore for receiving the needle therethrough. The first locking plate is further adapted to receive the needle guard and retention plate therein and is connected to the second locking plate.

Another object of the present invention is to provide an identification tag kit that can be permanently and safely attached to an object or animal appendage. The kit comprises a locking means having a retention plate therein which prohibits axial movement of the locking means away from the identification plate after the insertion of the needle through the retention plate bore. The locking means also comprises a conical needle guard which is adapted to receive the needle therein, thereby preventing injury from the sharp point of the needle. Applicant's unique multiple function locking means thereby combines the essential features of safety and permanence in a single component. As an additional feature of permanence, the needle comprises an annular head which is welded to the identification plate on the side of the plate opposite the needle point.

Still another object of the present invention is to provide an identification tag kit that permits the further attachment of an identification tag. An alternate embodiment of the kit includes a tag member connected to the identification plate, the tag member comprising a tag plate for receiving thereon an identification tag. The alternate kit also includes a means for securing the identification tag to the tag plate. The tag plate and identification plate are preferably aligned in parallel planes, thereby permitting the attachment of a tag having a wide upper portion and a narrow lower portion. Such a design permits the use of a tag that is both tear resistant and economical to manufacture.

A further object of the present invention is to provide an identification tag kit that provides an easy means for alerting an individual to an animal's presence and for determining whether an animal has been previously tagged without the nuisance and danger of close examination. The needle guard has a constitution or coloration that is clearly visible during day or night and may be clear and hollow to permit the placement of reflective sequins therein.

A still further object of the present invention is to provide a method of using the identification tag kit. The method comprises puncturing an object or animal appendage with the needle or inserting the needle through two links of a collar and thereafter inserting the needle into the locking means to the extent desired. The method of using the identification tag kit with an animal collar having a plurality of links achieves an even greater degree of permanence.

Further objects will be apparent as the identification tag kit and method of using same are described in greater detail hereinbelow.

BRIEF DESCRIPTION OF THE DRAWINGS

FIG. 7 is a perspective view of the identification tag kit as used with a collar having a plurality of links.

DESCRIPTION OF THE PREFERRED EMBODIMENT

Figure 1:
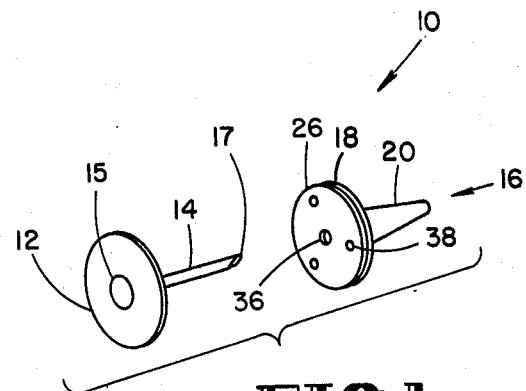
FIG. 1 is a perspective view of the components of the identification tag kit.
Figure 2:
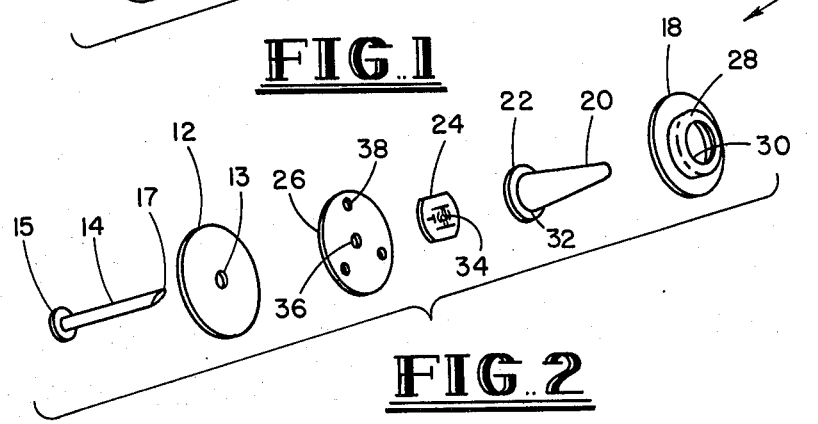
FIG. 2 is an exploded view of the elements of the identification tag kit.
Figure 3:
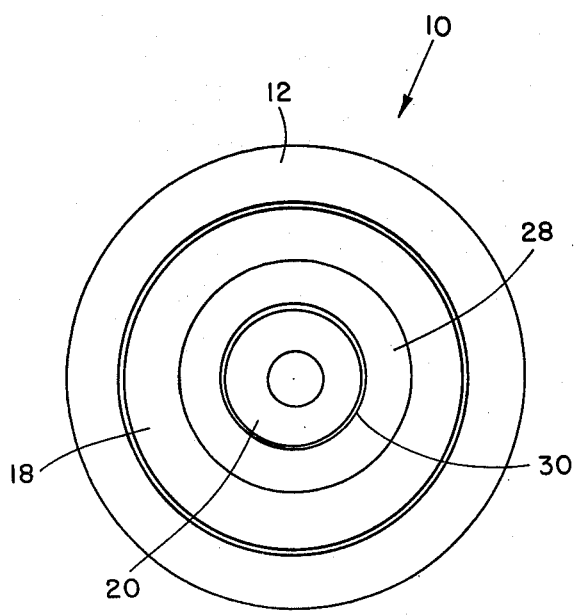
FIG. 3 is a front plan view of the assembled identification tag kit.
Figure 4:
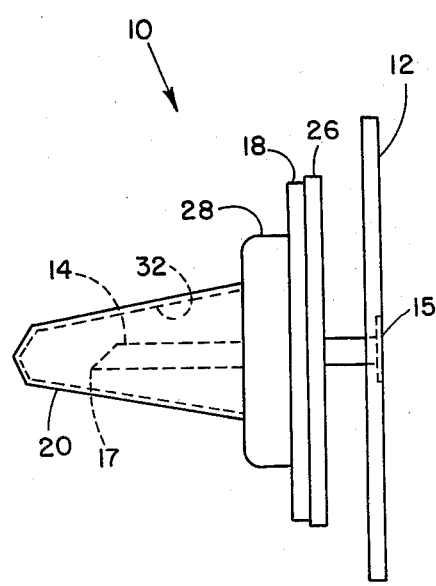
FIG. 4 is a side view of the assembled identification tag kit.

Referring to the several drawings, the identification tag kit is identified by the numeral 10. The kit comprises an identification plate 12 having a needle 14 extending therethrough and outward therefrom and a multiple function locking means, identified by the numeral 16. Needle 14 preferably has an annular head 15 and a sharp point 17. Needle 14 extends through bore 13 of identification plate 12 and is welded thereto on the side of identification plate 12 opposite needle point 17, as illustrated in FIG. 1. Since annular head 15 has a greater diameter than bore 13, identification plate 12 will remain permanently attached to locking means 16 in the event that the aforementioned weld should break.

It is to be understood that identification plate 12 will preferably have an identification number and/or telephone number (not shown) engraved or embossed thereon for readily identifying the owner of the object or animal. In the preferred usage, the finder of the object or animal calls the telephone number on identification plate 12 and recites the identification number embossed thereon. The identification number is thereafter matched with that of the owner.

Locking means 16 comprises a first locking plate 18, a conical needle guard 20 having an annular base 22, a retention plate 24, and a second locking plate 26. First locking plate 18 is adapted to receive annular base 22 of needle guard 20 and retention plate 24 by means of annular plate pocket 28. Locking plate 18 is further adapted to receive needle guard 20 therethrough by means of first locking plate bore 30.

Conical needle guard 20 is preferably constructed of hard plastic and has a hollow bore 32 therethrough adapted to receive needle 14 therein. Needle guard 20 protects a person coming in contact with the identified object or animal from the sharp point 17 of needle 14 and preferably has a constitution or coloration permitting maximum visibility. For example, needle guard 20 may be colored bright orange or yellow. Needle guard 20 may also be translucent and have reflective sequins (not shown) within hollow bore 32. This feature of the kit 10 functions to alert an individual to the animal's presence, thereby preventing injury to the animal or individual. This feature also permits an individual to readily determine whether a particular animal has been tagged. This feature is extremely important in municipal control of rabies; the bright colored and/or reflective needle guard 20 indicates that the animal in question has been vaccinated without the necessity of a close and perhaps dangerous examination.

Retention plate 24 has a slit and/or bore 34 for receiving needle 14 therethrough. Retention plate 24 is further adapted in a conventional fashion to prohibit axial movement of locking means 16 away from identification plate 12 after needle 14 has been inserted through retention plate bore 34. Second locking plate 26 is adapted to receive needle 14 therethrough by means of a second locking plate bore 36. Second locking plate 26 is further adapted to be permanently connected to first locking plate 18 by means of a plurality of locking plate connection bores 38. It is to be understood that locking plates 18 and 26 may be connected by rivets, electroplating means or other conventional method and that bores 30, 32, 34 and 36 are in axial alignment when locking plates 18 and 26 are connected.

Figure 5:
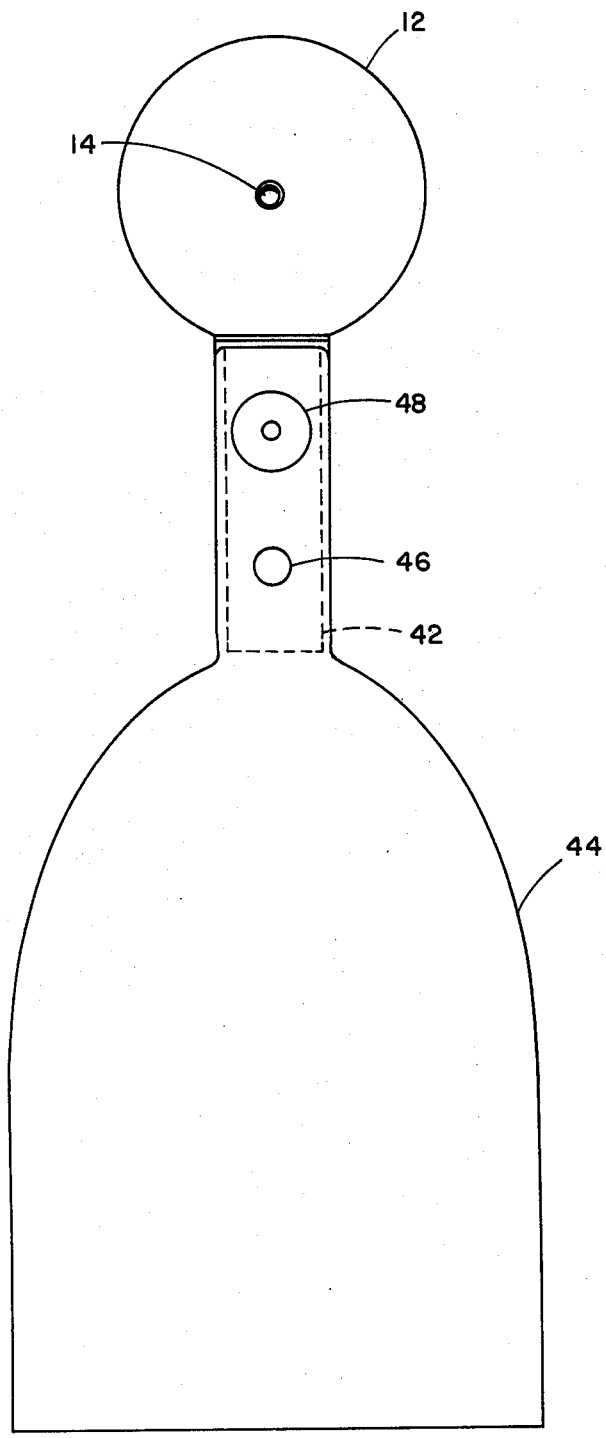
FIG. 5 is a front plan view of the alternative identification tag kit showing the tag member and identification tag.
Figure 6:
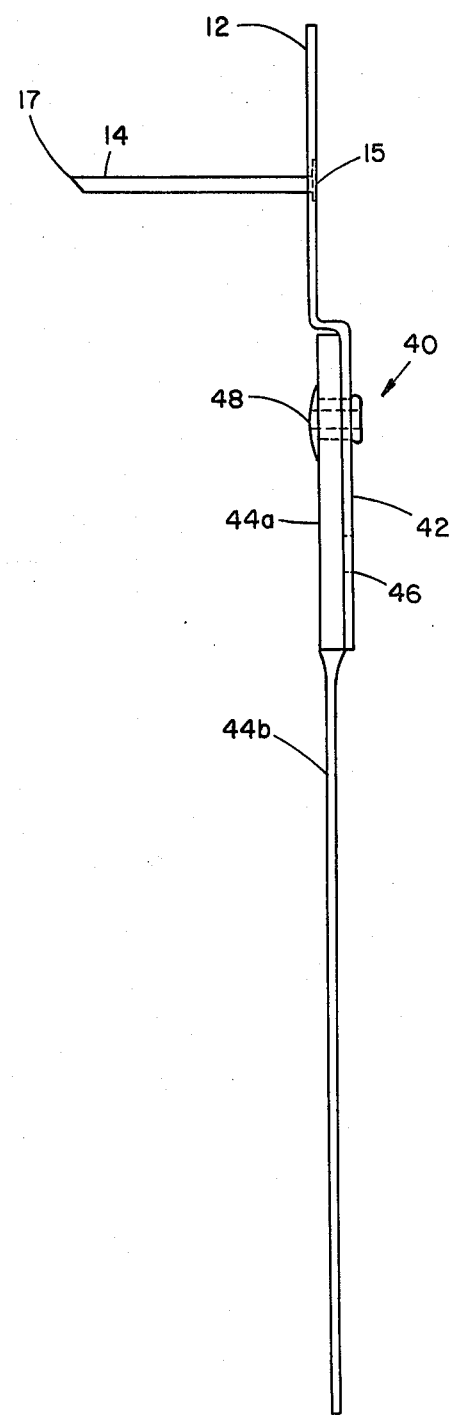
FIG. 6 is a side view of the alternate identification tag kit showing the tag plate and identification plate in parallel planes.

An alternate embodiment of the identification tag kit is shown in FIG. 5 and FIG. 6. In the alternate embodiment, the identification tag kit further comprises a tag member 40 connected to identification plate 12. The tag member 40 comprises a tag plate 42 capable of receiving thereon a preferably flexible identification tag 44. Tag plate 42 includes one or more tag plate bores 46 for receiving one or more rivets 48 or other means for connecting the identification tag 44 to the tag plate 42.

As illustrated in FIG. 6, tag plate 42 and identification plate 12 are preferably aligned in parallel planes. This allows tag 44 to have a thicker top end 44a and a narrower bottom end 44b. Such a design permits the use of a sturdy tag 44 that is tear resistant while at the same time conserving the material used to construct the tag.

The method of using the identification tag kit comprises puncturing an object, such as a collar or suitcase, or an animal appendage, such as an ear, with the sharp point 17 of needle 14. Thereafter, the needle 14 is extended through the object or animal appendage and inserted into the locking means 16 through bores 36, 34, 32, and 30, the locking means 16 being simultaneously pressed toward identification plate 12 to the degree desired. It is to be understood that after attachment, the needle guard 20 will preferably extend outward from the animal or object to facilitate the aforementioned maximum visibility.

It is also contemplated that the identification tag kit 10 may be attached to a collar 50 having a plurality of links 50A-50Z, thereby permanently attaching the kit 10 and collar 50 to an animal or object. As illustrated in FIG. 7, the needle 14 is inserted through a first link 50A and a second link 50Z after the collar 50 has been placed around the animal's neck (not shown). The needle 14 is thereafter inserted into the locking means 16 in above described fashion. Such an embodiment prohibits removal of the identification tag kit 10 and collar 50 and the subsequent reattachment of either to another animal or object. It is to be understood that either of the identification tag kit embodiments disclosed herein may be used with the above described methods of attachment.

The combination of conical needle guard 20 having a constitution permitting maximum visibility and retention plate 24 in a one piece locking means 16 creates a unique component combining the essential features of safety, permanence, and visibility. Furthermore, these features are achieved in an identification tag kit capable of having only two components. Multiple function locking means 16 is able, therefore, to overcome the limitations of the prior art yet keep to a minimum the number of components required for kit 10.

In the preferred embodiment, identification plate 12 has a diameter of approximately 1.0 inches, first locking plate 18 and second locking plate 26 have a diameter of approximately 0.75 inches, and the portion of needle guard 20 extending outward from plate pocket 28 has a maximum diameter of approximately 0.25 inches. It is also preferable that needle 14 have a length of approximately 0.75 inches and that needle guard 20 have a length of approximately 0.75 inches. In the alternate embodiment, it is preferable that tag plate 42 has a length of approximately 1.0 inches and a width of approximately 0.37 inches. These dimensions have been found to be most effective for purposes of handling, visibility, and engraving or embossing an identification number onto identification plate 12.

While the identification tag kit and method of using same has been described in connection with the preferred embodiment, it is not intended to limit the invention to the particular form set forth but on the contrary, it is intended to cover such alternatives, modifications, and equivalents as may be included within the spirit and scope of the invention as defined by the appended claims.

I claim:

1. An identification tag kit having components capable of being assembled and permanently attached to an object or animal appendage for identification purposes, comprising:

an identification plate having a bore therethrough and a diameter of approximately 1.0 inches, said identification plate having a needle extending through said bore and outward therefrom, said needle having a length of approximately 0.75 inches, said needle comprising an annular head on a first end thereof and a sharp point on a second end thereof, and wherein said annular head has a greater diameter than said identification plate bore and is welded to said identification plate on a side of said identification plate opposite said point;

a multiple function locking means comprising a first locking plate having an annular plate pocket and a first bore through said plate pocket, said first bore adapted for receiving a forward end of a conical, plastic needle guard therethrough, said needle guard having an annular base on a rearward end thereof, a length of approximately 0.75 inches, and a hollow bore therethrough within which to receive said needle, said needle guard having a bright orange or yellow coloration to permit maximum visibility thereof, said plate pocket adapted to receive therein said annular base and a retention plate, said forward end of said needle guard extending outward from said first locking plate through said first bore, said retention plate having a bore for receiving said needle therethrough and thereafter prohibiting axial movement of said locking means away from said identification plate, said locking means further comprising a second locking plate having a second bore for receiving said needle therethrough and wherein said first locking plate is connected to said second locking plate, said first and second locking plates having a diameter of approximately 0.75 inches, and wherein said first bore, said second bore, and said retention plate bore are in axial alignment; and a collar having a plurality of interconnected links, a first link on a first end thereof and a second link on a second end thereof opposite said first end, said first and second links adapted to receive said needle therethrough prior to insertion of said needle into said locking means, thereby to permanently connect said first and second links and said collar about said object or animal, said identification plate, locking means, and collar combining to prohibit removal of said collar from said object or animal and permit ready visibility and identification of said object or animal.

2. A method of assembling and attaching an identification tag kit having components capable of being assembled and permanently attached to an object for identification purposes, comprising the steps of:

inserting a needle through a first and second link on opposite ends of a collar having a plurality of said links, said needle having a length of approximately 0.75 inches, said needle extending through and outward from an identification plate having a diameter of approximately 1.0 inches and a bore therethrough, said needle extending through said bore and comprising an annular head on a first end thereof and a sharp point on a second end thereof, and wherein said annular head has a greater diameter than said identification plate bore and is welded to said identification plate on a side of said identification plate opposite said point; and inserting said needle into a multiple function locking means, said locking means being simultaneously pressed toward said identification plate, said locking means comprising a first locking plate having an annular plate pocket and a first bore through said plate pocket, said first bore adapted for receiving a forward end of a conical, plastic needle guard therethrough, said needle guard having an annular base on a rearward end thereof, a length of approximately 0.75 inches, and a hollow bore therethrough within which to receive said needle, said needle guard having a bright orange or yellow coloration to permit maximum visibility thereof, said plate pocket adapted to receive therein said annular base and a retention plate, said forward end of said needle guard extending outward from said first locking plate through said first bore, said retention plate having a bore for receiving said needle therethrough and thereafter prohibiting axial movement of said locking means away from said identification plate, said locking means further comprising a second locking plate having a second bore for receiving said needle therethrough and wherein said first locking plate is connected to said second locking plate, said first and second locking plates having a diameter of approximately 0.75 inches, and wherein said first bore, said second bore, and said retention plate bore are in axial alignment, said identification plate, locking means, and collar combining to prohibit removal of said collar from said object or animal and permit ready visibility and identification of said object or animal.

3. An identification tag kit having components capable of being assembled and permanently attached to an object or animal appendage for identification purposes, comprising:

an identification plate having a bore therethrough and a diameter of approximately 1.0 inches, said identification plate having a needle extending through said bore and outward therefrom, said needle having a length of approximately 0.75 inches, said identification plate further comprising a tag member connected thereto, said tag member comprising a tag plate having a length of approximately 1.0 inches and a width of approximately 0.37 inches, for receiving thereon an identification tag, and a plurality of tag plate bores for securing said identification tag to said tag plate, said tag plate and identification plate being aligned in parallel planes to thereby permit attachment of an identification tag having a thicker upper portion secured to said tag plate and a thinner lower portion relative to said upper portion;

a multiple function locking means comprising a first locking plate having an annular plate pocket and a first bore through said plate pocket, said first bore adapted for receiving a forward end of a conical, plastic needle guard therethrough, said needle guard having an annular base on a rearward end thereof, a length of approximately 0.75 inches, and a hollow bore therethrough within which to receive said needle, said needle guard having a bright orange or yellow coloration to permit maximum visibility thereof, said plate pocket adapted to receive therein said annular base and a retention plate, said forward end of said needle guard extending outward from said first locking plate through said first bore, said retention plate having a bore for receiving said needle therethrough and thereafter prohibiting axial movement of said locking means away from said identification plate, said locking means further comprising a second locking plate having a second bore for receiving said needle therethrough and wherein said first locking plate is connected to said second locking plate, said first and second locking plates having a diameter of approximately 0.75 inches, and wherein said first bore, said second bore, and said retention plate bore are in axial alignment; and a collar having a plurality of interconnected links, a first link on a first end thereof and a second link on a second end thereof opposite said first end, said first and second links adapted to receive said needle therethrough prior to insertion of said needle into said locking means, thereby to permanently connect said first and second links and said collar about said object or animal, said identification plate, locking means, and collar combining to prohibit removal of said collar from said object or animal and permit ready visibility and identification of said object or animal.

4. A method of assembling and attaching an identification tag kit having components capable of being assembled and permanently attached to an object or animal for identification purposes, comprising the steps of:

inserting a needle through a first and second link on opposite ends of a collar having a plurality of said links, said needle having a length of approximately 0.75 inches, said needle extending through and outward from an identification plate having a diameter of approximately 1.0 inches and a bore therethrough, said needle extending through said bore and comprising an annular head on a first end thereof and a sharp point on a second end thereof, and wherein said annular head has a greater diameter than said identification plate bore and is welded to said identification plate on a side of said identification plate opposite said point, said identification plate further comprising a tag member connected thereto, said tag member comprising a tag plate having a length of approximately 1.0 inches and a width of approximately 0.37 inches, for receiving thereon an identification tag, and a plurality of tag plate bores for securing said identification tag to said tag plate, said tag plate and identification plate being aligned in parallel planes to thereby permit attachment of an identification tag having a thicker upper portion secured to said tag plate and a thinner lower portion relative to said upper portion; and inserting said needle into a multiple function locking means, said locking means being simultaneously pressed toward said identification plate, said locking means comprising a first locking plate having an annular plate pocket and a first bore through said plate pocket, said first bore adapted for receiving a forward end of a conical, plastic needle guard therethrough, said needle guard having an annular base on a rearward end thereof, a length of approximately 0.75 inches, and a hollow bore therethrough within which to receive said needle, said needle guard having a bright orange or yellow coloration to permit maximum visibility thereof, said plate pocket adapted to receive therein said annular base and a retention plate, said forward end of said needle guard extending outward from said first locking plate through said first bore, said retention plate having a bore for receiving said needle therethrough and thereafter prohibiting axial movement of said locking means away from said identification plate, said locking means further comprising a second locking plate having a second bore for receiving said needle therethrough and wherein said first locking plate is connected to said second locking plate, said first and second locking plates having a diameter of approximately 0.75 inches, and wherein said first bore, said second bore, and said retention plate bore are in axial alignment, said identification plate, locking means, and collar combining to prohibit removal of said collar from said object or animal and permit ready visibility and identification of said object or animal.

* * * * *